No. 879,432. PATENTED FEB. 18, 1908.
R. E. ALLDAY.
FISH TRAP.
APPLICATION FILED JULY 29, 1907.
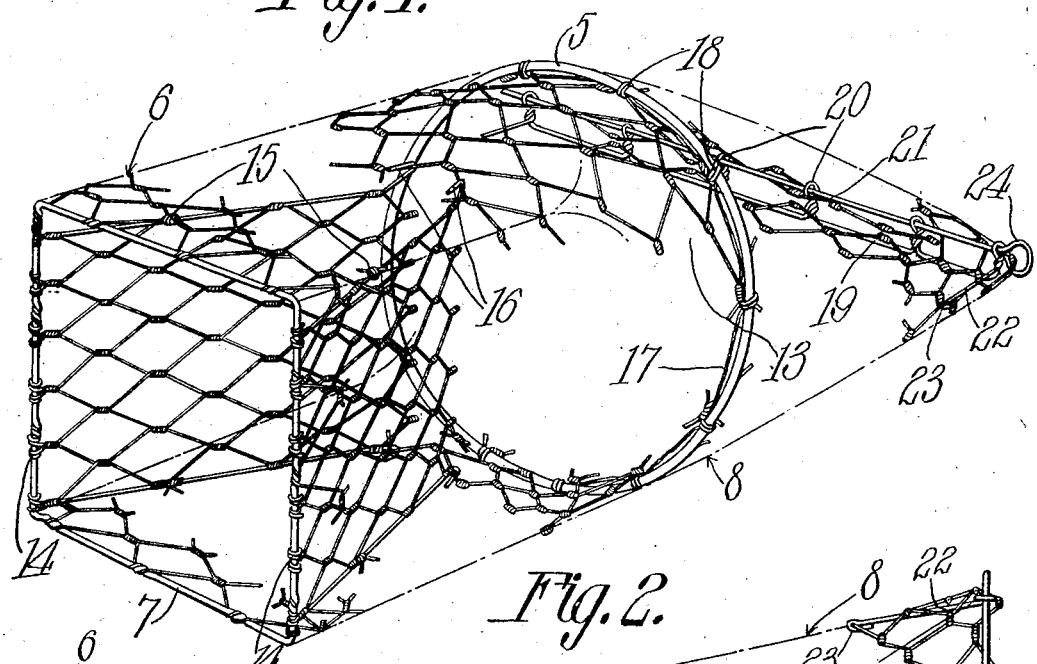
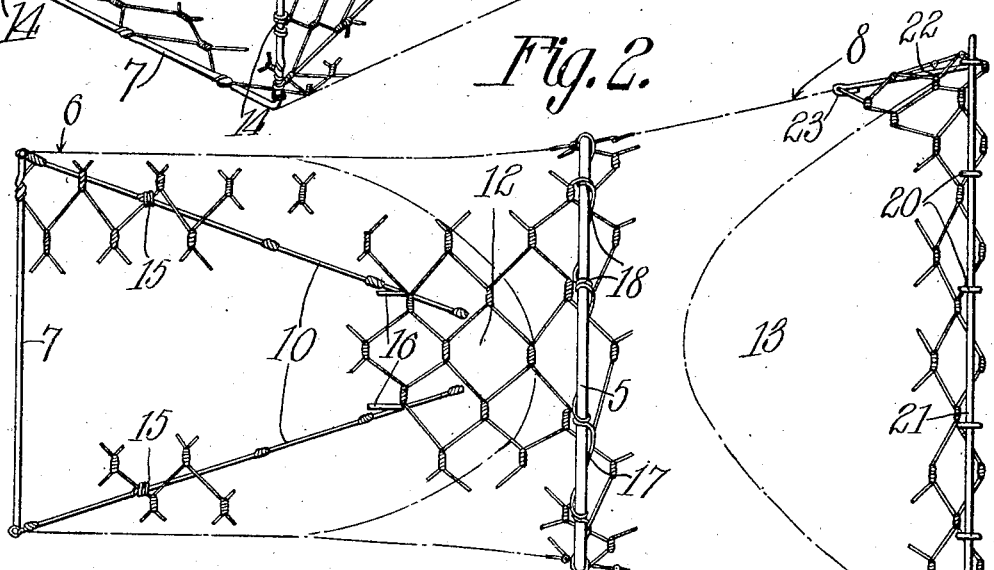
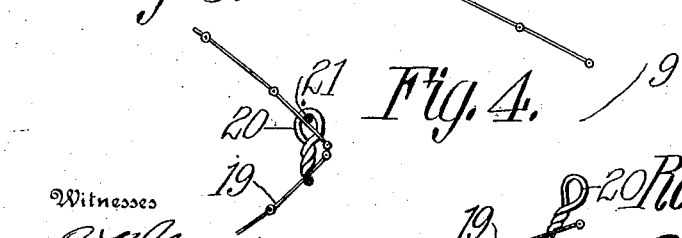
Witnesses
Inventor
Robert E. Allday,
By C. A. Snow & Co.
Attorneys

UNITED STATES PATENT OFFICE.

ROBERT E. ALLDAY, OF ATLANTA, TEXAS, ASSIGNOR TO DAVIS H. ALLDAY, OF ATLANTA, TEXAS.

FISH-TRAP.

No. 879,432.  Specification of Letters Patent.  Patented Feb. 18, 1908.

Application filed July 29, 1907. Serial No. 386,042.

*To all whom it may concern:*

Be it known that I, ROBERT E. ALLDAY, a citizen of the United States, residing at Atlanta, in the county of Cass and State of Texas, have invented a new and useful Fish-Trap, of which the following is a specification.

This invention relates to fish traps and has for its object to provide a comparatively simple and inexpensive device of this character which is strong and durable in construction and thoroughly efficient in operation.

A further object of the invention is to provide a trap the intermediate portion of which is substantially cylindrical in shape with the walls of the trap between the cylindrical portion and one end of the trap inclined or tapered the opposite end of the trap being angular in cross section, there being a reinforcing band encircling the cylindrical portion of the trap thereby to reinforce and strengthen the same.

A further object is to form the tapered portion of the trap with an open end to permit the removal of fish, said open end being normally closed by a locking key extending transversely of the trap and threaded in spaced loops secured to one of the walls of said openings.

A further object is to provide means for yieldably supporting the inclined wings or flaps within the angular portion of the trap, and means for preventing the fish in said trap from forcing the free ends of the trap together and thus obstructing the intermediate passage.

A still further object of the invention is to generally improve this class of devices so as to increase their utility, durability and efficiency.

Further objects and advantages will appear in the following description, it being understood that various changes in form, proportions and minor details of construction may be resorted to within the scope of the appended claims.

In the accompanying drawings forming a part of this specification: Figure 1 is a perspective view of a trap constructed in accordance with my invention, a portion of the trap being broken away to show the interior construction of the same. Fig. 2 is a top plan view. Fig. 3 is a detail longitudinal sectional view showing the walls of the rear opening locked in closed position. Fig. 4 is a similar view showing the walls of the opening separated to permit the removal of the fish.

Similar numerals of reference indicate corresponding parts in all of the figures of the drawings.

The improved trap forming the subject matter of the present invention is preferably formed of woven mesh wire and consists of an elongated casing or receptacle the intermediate portion of which is substantially cylindrical in shape with the side walls of the casing between the cylindrical portion and the rear end of the receptacle inclined or tapered, the opposite end of said casing being substantially rectangular in cross section, as shown, there being a circumferential band encircling the cylindrical portion of the trap thereby to reinforce and strengthen the same. The wire netting at the angular portion 6 of the trap is soldered or otherwise rigidly secured to a substantially rectangular supporting frame 7 constituting the mouth of the trap while the upper and lower faces of the tapered portion 8 are inclined from the reinforcing band 5 towards the adjacent end of the trap, the ends of the wire netting at the rear end of the trap being disconnected to form an opening 9 through which the fish may be conveniently removed from the trap.

Arranged within the angular portion 6 of the trap are inclined wings or flaps 10 also preferably formed of wire netting and extending the entire height of the trap, as shown, said flaps being spaced apart to form an intermediate passage thereby to permit the fish to enter the mouth of the trap and pass through the contracted throat 12 of the wings to the rear compartment or chamber 13.

The wire strands forming the inclined wings 10 are coiled around or otherwise rigidly secured to the rectangular frame 7, as indicated at 14, while the upper and lower edges of the wings are fastened by wires or clips 15 to the adjacent walls of the trap thereby to maintain the wings in proper spaced relation, and also to permit the free ends of the wings to move laterally so as to permit the passage of large fish.

As a means of preventing the fish in the trap from closing the contracted neck 12, the upper and lower longitudinal edge of each wing 10 is formed with a terminal hook 16 which engages the adjacent strand of wire netting, as best shown in Fig. 1 of the drawings. It will thus be seen that the free ends of the wings are yieldably supported in spaced relation to each other so as to permit the passage of large or small fish, but are locked against inward movement by means of the hooks 16.

The reinforcing band 5 is retained in position on the trap by means of a wire strand 17 which engages the wire netting forming the wall of the trap and is coiled around the reinforcing band at pre-determined intervals, as indicated at 18.

Extended transversely of the trap at the opening 9 is a locking member preferably formed in two sections the lower section 19 of which is secured to the lower wall of said opening and is provided with a plurality of spaced vertically disposed loops 20 which project through the wire mesh of the opposite wall of the opening for engagement with a locking rod or pin 21 constituting the mating section of said locking member.

The opposite ends of the wire forming the section 19 of the locking member are bent laterally to form oppositely disposed arms 22 the terminals of which are provided with hooks 23 which engage the wire netting on each side of the cylindrical portion 8, as shown and thus serve to prevent accidental displacement of said locking member.

The locking pin 31 is preferably provided with a finger piece or loop 24 by means of which the pin may be conveniently inserted through the spaced loops 20 when it is desired to close the opening 9.

In operation the fish enter through the mouth of the trap at the rectangular end thereof and thence pass through the contracted throat 12 of the inclined wings 10 into the compartment 13 from which they may be removed by withdrawing the locking pin 24 and expanding the adjacent walls of the opening 9, as best shown in Fig. 4 of the drawings.

In order to close the trap it is merely necessary to contract the walls of the opening 9 and insert the locking rod or pin 21 through the loops 20 thus clamping the walls of the opening in engagement with each other and effectually preventing the escape of fish, as illustrated in Fig. 3 of the drawing.

Attention is here called to the fact that by making the forward portion of the trap of angular formation, said trap will rest squarely on the bed of the stream while by reason of the oppositely inclined walls of the tapered portion of the trap the fish are guided towards the opening 9 so that the operator may conveniently remove all of the fish in the rear compartment 13 through said opening.

The traps may be made in different sizes and shapes and will preferably be formed of green woven mesh or net wire.

Having thus described the invention what is claimed is:

1. A fish trap including a casing having an opening at one end thereof and constituting the mouth of the trap, the adjacent walls of the casing at opposite end of the trap being separated, inclined wings extending inwardly from the mouth of the trap, and a locking member formed in two sections one of which is secured to one of the walls of the casing and provided with a plurality of spaced loops, the opposite section of the locking member being extended through the loops for drawing said walls in contact with each other.

2. A fish trap including a casing having a frame at one end thereof and constituting the mouth of the trap, there being an opening formed in the opposite end of the trap, inclined wings secured to the frame and defining an intermediate passage communicating with the interior of the trap, a bar secured to one of the walls of the opening and provided with spaced loops, and a locking pin carried by the opposite wall of the opening and extending through said loops for drawing said walls together thereby to close the opening.

3. A fish trap including a casing having a frame at one end thereof and constituting the mouth of the trap, there being an opening formed in the opposite end of said trap, inclined wings secured to the frame and defining an intermediate passage communicating with the interior of the trap, a bar secured to one wall of the opening and having its intermediate portion provided with spaced vertically disposed loops and its opposite ends bent to form angularly disposed arms terminating in hooks for engagement with the adjacent walls of the casing, and a locking pin extending transversely of the trap and threaded through the loops.

4. A fish trap including a foraminous casing having one end thereof angular in cross section and its intermediate portion substantially cylindrical in shape, the upper and lower walls of the trap between the cylindrical portion thereof and the adjacent end of the trap being inclined rearwardly to form an opening, a reinforcing ring surrounding the trap and disposed at the cylindrical portion thereof, yieldably supported wings disposed within the angular portion of the trap and defining an intermediate passage, and locking means for drawing the walls of the trap together at said opening.

5. A fish trap including a casing formed of wire netting and having one end thereof angular in cross section and its intermediate portion substantially cylindrical in shape, the upper and lower walls of the trap between the cylindrical portion thereof and the adjacent end of the trap being inclined rearwardly to form an opening, a reinforcing band surrounding the casing at the cylindrical portion thereof, a binding wire coiled around the reinforcing band and engaging the wire netting, yieldably supported wings arranged within the angular portion of the trap, and a locking member for drawing the walls of the trap together at said opening.

6. A fish trap including a casing formed of woven mesh wire and provided with a rectangular frame constituting the mouth of the trap, there being an opening formed in the opposite end of the casing, inclined wings secured to the rectangular frame and spaced apart to form an intermediate passage, hooks secured to the upper and lower longitudinal edges of the wings and engaging the adjacent strands of the wire casing for limiting the lateral movement of the wings, and fastening devices secured to the intermediate portions of the wings.

7. A fish trap including an elongated casing formed of woven mesh wire one end of which is rectangular in cross section and provided with a rectangular reinforcing frame, the upper and lower walls of the casing being inclined towards the opposite end thereof and spaced apart to produce an opening, a reinforcing band disposed at the juncture of the angular and tapered portions of the casing, wings secured to the rectangular frame and spaced apart to form an intermediate passage, terminal hooks formed on the upper and lower longitudinal edges of the wings and engaging the casing for limiting the lateral movement of the wings, fastening devices secured to the longitudinal edges of the wings between the hooks and the fixed ends of said wings and secured to the casing, and a locking member for drawing the walls of the trap together at said opening.

In testimony that I claim the foregoing as my own, I have hereto affixed my signature in the presence of two witnesses.

ROBERT E. ALLDAY.

Witnesses:
 ROB HOWE,
 M. L. ALLDAY.